United States Patent [19]

Lichtin et al.

[11] Patent Number: 4,938,855

[45] Date of Patent: Jul. 3, 1990

[54] PHOTOPROMOTED CATALYTIC METHOD FOR MAKING AMMONIA FROM MOLECULAR NITROGEN USING MOLECULAR HYDROGEN AS A REDUCING AGENT

[75] Inventors: Norman N. Lichtin, Newton Center; Junchang Dong, Brookline, both of Mass.

[73] Assignee: Boston University, Boston, Mass.

[21] Appl. No.: 315,965

[22] Filed: Feb. 27, 1989

[51] Int. Cl.$^5$ .............................................. B01J 19/08
[52] U.S. Cl. ........................... 204/157.46; 204/157.52; 423/352
[58] Field of Search ...................... 204/157.46, 157.52; 423/352

[56] References Cited

U.S. PATENT DOCUMENTS

| | | | |
|---|---|---|---|
| 974,741 | 11/1910 | Blackmore | 204/157.46 |
| 2,500,008 | 3/1950 | Richardson | 204/157.46 |
| 4,113,590 | 9/1978 | Schrauzer | 204/157.46 |
| 4,287,036 | 9/1981 | Tsutsui | 204/157.46 |
| 4,427,509 | 1/1984 | Lichtin | 204/157.46 |
| 4,427,510 | 1/1984 | Lichtin | 204/157.46 |
| 4,612,096 | 9/1986 | Lichtin | 204/157.46 |
| 4,762,600 | 8/1988 | Khader | 204/157.46 |

FOREIGN PATENT DOCUMENTS

| | | | |
|---|---|---|---|
| 58-60614 | 4/1983 | Japan | 423/352 |
| 1353731 | 11/1987 | U.S.S.R. | 204/157.46 |

*Primary Examiner*—John F. Niebling
*Assistant Examiner*—Ben C. Hsing
*Attorney, Agent, or Firm*—David Prashker

[57] ABSTRACT

A photopromoted catalytic method of producing ammonia by the reduction of molecular nitrogen is provided using a solid metal oxide catalyst and molecular hydrogen as the reducing agent. Pure gaseous nitrogen can be reduced by gaseous hydrogen in the absence of water using a photopromoted reaction which uses solar and/or artificial photoenergy.

3 Claims, No Drawings

PHOTOPROMOTED CATALYTIC METHOD FOR MAKING AMMONIA FROM MOLECULAR NITROGEN USING MOLECULAR HYDROGEN AS A REDUCING AGENT

FIELD OF THE INVENTION

The invention is concerned with chemical methods of producing ammonia which reduce molecular nitrogen under mild conditions using solar, and/or artificial sources of photoenergy.

BACKGROUND OF THE INVENTION

The world's principal industrial processes for fixing atmospheric nitrogen are the Haber-Bosch process and similar methodologies which combine molecular nitrogen with hydrogen over solid catalysts at high temperatures and pressures to form ammonia. These processes require relatively large amounts of energy, are technically sophisticated, and are primarily based on the use of fossil fuels (for instance coal or natural gas) in the production of hydrogen. By their very nature and chemical requirements, such methodologies are appropriate only for economies of large scale which can provide the reactants in volume, central production facilities, and the requisite distribution systems for effective use of the process.

Alternatives to large scale industrial methods for production of ammonia have been sought with the result that considerable chemical research has been directed towards finding economically viable and less energy-consuming methods. One approach has been the use of metal oxide catalysts and gaseous nitrogen from the air in the absence of photoenergy. Exemplifying this approach is U.S. Pat. No. 2,500,008 which describes the synthesis of ammonia from a mixture of hydrogen and nitrogen which is combined with a finely divided iron oxide catalyst and subjected to ultrasonic vibrations. Another approach uses catalytic processes which synthesize ammonia from nitrogen and water without the use of elemental hydrogen by using various wavelengths of photoenergy. Consistent with these developments is the use of solar energy in various forms as the sole energy source and the use of water almost exclusively as the reducing agent. Exemplifying this latter approach are the following: "Photolysis of Water and Photoreduction of Nitrogen on Titanium Dioxide," *Journal of the American Chemical Society* 99:7189–7193 (1977) which describes the photoreduction of nitrogen to ammonia using titanium dioxide alone or when doped with iron, cobalt, molybdenum or nickel, or iron oxide alone; U.S. Pat. No. 4,113,590 which discloses the synthesis of ammonia and hydrazine by reduction of gaseous nitrogen with water using metal oxide catalysts under the influence of ultraviolet light; U.S. Pat. No. 4,427,510 which recites the synthesis of nitrogen-containing compounds by combining metal oxide compounds with gaseous nitrogen, a reducing agent such as water, and a source of light whose wavelengths are in the visible ranges provided by sunlight or artificial light; U.S. Pat. No. 4,612,096 which demonstrates the synthesis of ammonia from an aqueous medium using a solid metal oxide catalyst and an organic composition in the presence of photoenergy; and U.S. Pat. No. 4,762,600 which identifies a novel, activated catalyst for the synthesis of ammonia in a photoassisted reduction of molecular nitrogen by water.

A net result of the advances described within these publications (and the other references cited therein) has been the recognition and general acceptance of several premises as basic axioms in this art. These are: First, in any photopromoted catalytic process using a metal oxide catalyst for the reduction of molecular nitrogen, no measurable reduction of nitrogen will occur without some light energy being added to the reaction mixture. Second, water has been and presently remains the reducing agent of choice used almost always in the photopromoted catalytic synthesis; although other reducing agents such as aqueous organic suspensions have been recently developed, water remains the most favored reducing agent in such photopromoted catalytic syntheses. Third, the average yields of ammonia (and other nitrogen-containing compounds) using photopromoted catalytic processes now known in the art are notably small. Given these generally applicable axioms of this art, it will be apparent to one ordinarily skilled in this art that a photopromoted catalytic process for synthesizing ammonia using a solid metal oxide catalyst, molecular nitrogen, and molecular hydrogen as the reducing agent constitutes a major improvement and advancement in this field.

SUMMARY OF THE INVENTION

A method for making ammonia is provided which comprises the steps of:
  combining a solid metal oxide catalyst with molecular nitrogen and molecular hydrogen as a reaction mixture, and
  adding photoenergy to said reaction mixture such that ammonia is yielded as a reaction product.

DETAILED DESCRIPTION OF THE PREFERRED EMBODIMENTS

The present invention is a photopromoted catalytic reaction process which reduces molecular nitrogen to ammonia at ambient pressures of about one atmosphere and at temperatures ranging from about 50° to 100° C. The invention combines as a reaction mixture at least one finely divided solid metal oxide catalyst; molecular nitrogen in gaseous form; molecular hydrogen as the reducing agent. The reaction mixture need not be completely pure in content; under normal use conditions, it is expected that a variety of minor impurities such as water vapor, methane, and carbon dioxide might incidentally be present. Photoenergy is then added to the reaction mixture for the synthesis of ammonia. As used herein, photoenergy is defined as electromagnetic radiation of any wavelength. The reaction may be conducted continuously over entire twenty-four hour periods cyclically using solar energy and artificial sources of photoenergy for a maximum yield of ammonia. In this way, the photoassisted reaction can be employed to synthesize ammonia in a continuous, abundant, and regular manner.

The methodology comprising the present invention may be performed in any appropriate apparatus or housing such as a pyrex glass reactor. In all instances, a source of molecular nitrogen must be provided, such as pure gaseous nitrogen, which has access to the metal oxide catalyst within the glass reactor or other reaction housing. Similarly, molecular hydrogen must also be placed in reactive contact with the metal oxide catalyst. The reaction system variables include: the allowed time for reaction; the wavelengths of incident photoenergy; the precise temperature and pressure of reaction; the amount and kind of catalyst; the deployment of the catalyst; and the flowrate of the gaseous reactants. All of these are matters of choice known in the art and may be selected to meet the user's individual requirements or convenience.

A number of different metal oxide compositions are believed to be useful as catalysts within the process of the present invention. These catalysts are conventionally known and prepared in the art and include: iron oxides, preferably partially reduced $\beta Fe_2O_3$; $MoO_3$; $Nd_2O_3$; $PbO$; $WO_3$; La-Fe-oxide; and Zn-Fe-oxide. Methods for the preparation and preconditioning of these catalysts are commonly known. Illustrative examples are described by U.S. Pat. Nos. 4,427,510 and 4,113,590.

As the empirical data presented hereinafter demonstrates, some catalyst compositions and formulations are not operative within the reaction synthesis. Examples of inoperative catalysts include mixtures of metallic iron and $TiO_2$ and Degussa P25 $TiO_2$, both of which are deemed not to be suitable for use in the present invention.

The solid catalyst chosen is preferably used in a subdivided form such as a fine powder in order to expose a large surface for reaction. It is not necessary that the solid catalyst be dispersed in a liquid medium for the reaction between the catalyst, the hydrogen, and the nitrogen to occur. Alternatively, if a liquid carrier is desired, both aqueous and organic liquids may be employed for dispersion purposes.

The molecular nitrogen and molecular hydrogen used in the present reaction synthesis may be obtained from any source. Each reactant can be introduced to the solid catalyst individually; or the reactants may be combined first as a gaseous mixture if this is desirable. In general, the reaction desirably employs nitrogen and hydrogen at volumetric ratios ranging from 1:10 to 10:1. A preferred ratio of nitrogen to hydrogen is 1:3.

In addition, while the described method may be used at ambient temperatures and pressures, it is preferably carried out at one atmosphere and at a temperature from about 50° C. to about 100° C. If desired, however, the temperature and pressure ranges can be greatly extended in individual circumstances to produce optimum yields of ammonia.

In the example which follows, the unique process was carried out in a thermostatically controlled pyrex glass reactor containing a film of solid metal oxide catalyst suspension made by evaporating a suspension of the catalyst in methanol under vacuum and then irradiating the catalytic film using a 150 watt Xenon lamp or 150 watt quartz-halogen lamp with focusing lenses placed approximately 10 centimeters from the reactor. Photoenergy was transmitted without use of a filter to remove shorter wavelengths. Reaction times varied but the temperatures were maintained at 70° C. Pure gaseous nitrogen and hydrogen at a ratio of 1:3 was passed through the reactor at a rate of 0 to 300 milliliters per minutes (hereinafter ml/min) with 60 to 100 ml/min being preferred. Product ammonia in the effluent gas was trapped in mildly acidified ice-cold water. Back diffusion of water vapor into the reactor was prevented by conventional means. Yields of ammonium ion were measured using ion-selective potentiometry.

Illustrative Example

Nitrogen and hydrogen were fed into the reactor (evacuated beforehand) in the ratio of one to three. Each catalyst was dispersed in methanol; coated to the inner wall of the reactor chamber; and vacuum dried. Illumination was provided by either a 150w Xenon lamp or a 150w quartz-halogen lamp. The reaction temperature was maintained at 70° C. and the reaction time was 10 to 40 hours. Possible ammonia was trapped by 0.01M hydrochloric acid and analyzed by ammonia selective electrode. The results are given by Table 1.

TABLE 1

| CATALYST | RATIO OF NITROGEN HYDROGEN | REACTION TIME (hours) | YIELD OF AMMONIA | RATE OF AMMONIA SYNTHESIS |
|---|---|---|---|---|
| Degussa P25 $TiO_2$ | 1:3 | 24 | None | 0 |
| Metallic iron + $TiO_2$ | 1:3 | 24 | None | 0 |
| Partially reduced $\alpha$-$Fe_2O_3$ | 1:3 | 40 | 1.25 micromoles | 0.031 micromoles per hour |

There are also a variety of advantages provided by the present invention. On a scientific basis, the theoretical upper limit of photoefficiency for the present invention is substantially higher than that provided by a reduction of molecular nitrogen by water. On a practical use basis, the present invention offers very low energy requirements; a minimum of operating costs and initial investment; and a much greater ease of operation in comparison to conventionally known systems. There is also no need for an elaborate distribution system or technically advanced personnel. Finally, the reaction method allows and intends the reaction product, ammonia, to be used at or near to its place of manufacture.

The present invention is not to be restricted in form or limited in scope except by the claims appended hereto.

What we claim is:

1. A photopromoted method for making ammonia by the reduction of nitrogen, said method comprising the steps of:
    combining at least one solid metal oxide catalyst with molecular nitrogen and molecular hydrogen as the reducing agent to form a reaction mixture at about one atmosphere of pressure; and
    adding photoenergy to said reaction mixture.
2. The photopromoted method as recited in claim 1 wherein said photoenergy is solar energy.
3. The photopromoted method as recited in claim 1 wherein said photoenergy is artificially generated.

* * * * *